3,849,335
ABRASION-RESISTANT CATALYST CONTAINING BORIC ACID SUITABLE FOR THE REARRANGEMENT OF KETOXIMES

Otto Immel, Krefeld-Uerdingen, and Hans-Helmut Schwarz, Krefeld, Germany, assignors to Bayer Aktiengesellschaft, Leverkusen, Germany
No Drawing. Original application Oct. 9, 1969, Ser. No. 865,194, now abandoned. Divided and this application Apr. 5, 1971, Ser. No. 131,496
Claims priority, application Germany, Oct. 12, 1968, P 18 02 887.0
Int. Cl. C07d 41/04
U.S. Cl. 252—432         6 Claims

ABSTRACT OF THE DISCLOSURE

Abrasion-resistant catalysts containing boric acid and boron nitride suitable for the rearrangement of ketoximes are obtained by heating at a temperature of 250° to 900° C., (A) a mixture of boric acid and a supporting material; and (B) 1–30% by weight based on (A) of a nitrogen-containing compound which forms boron nitride with boric acid or boron trioxide, e.g. $NH_4OH$ or urea. These catalysts exhibit greater abrasion resistance than the corresponding prior art catalysts comprising boric acid and a support without boron nitride.

DISCLOSURE

This application is a divisional application of Ser. No. 865,194, filed Oct. 9, 1969, now abandoned.

The invention relates to a process for the production of abrasion-resistant catalysts containing boric acid suitable for the rearrangement of ketoximes wherein the catalysts are heated together with nitrogen-containing compounds.

It is known that oximes of cyclic ketones, cyclohexanone oxime in particular, can be rearranged to form the corresponding lactams in the gas phase 250° to 360° C. on catalysts containing boric acid. Aluminium oxide, titanium dioxide, tin dioxide, calcium phosphate or carbon black, for example, is used as supporting material for the boric acid.

The rearrangement reaction is carried out in a fixed bed or fluidised bed, optionally in the presence of a carrier gas and optionally in the presence of steam, either at normal pressure or at reduced pressure. Since the reaction is highly exothermic, it is difficult with fixed catalysts to obtain an uniform temperature distribution so that it is preferred in practice to employ the fluidised bed principle.

Despite their high catalytic activity, however, conventional catalysts containing boric acid show mechanical deficiencies, especially when they are used for the rearrangement of oximes in a fluidised bed. Due to incessant movement in the fluidised bed, the catalyst particles disintegrate and the finer particles formed are entrained by the gas. This loss has to be compensated by the addition of fresh catalyst.

It is an object of this invention to provide a process for the production of catalysts containing boric acid which show outstanding mechanical strength and which suffer smaller losses through abrasion than conventional catalysts containing boric acid.

This object is accomplished by a process for the production of abrasion-resistant catalysts containing boric acid suitable for the rearrangement of ketoximes, which comprises heating a mixture of boric acid and supporting material together with a nitrogen-containing compound which forms boron nitride with boric acid or boron trioxide, said heating being effected at a temperature of from 250 to 900° C.

As the nitrogen-containing compounds forming boron nitride with compounds of boron, for example $NH_4OH$, $(NH_4)_2CO_3$, $NH_4Cl$, urea, thiourea or guanidine, are additionally worked into a mixture of boric acid and supporting material during preparation of the catalyst. The quantities in which these additives can be used may vary wide limits and are governed by the type of supporting material, although an addition of from 1 to 30% by weight, based on the weight of boric acid plus supporting material, has proved to be effective. Preferably 1 to 10% by weight are added. The mechanical strength of catalysts containing boric acid is improved by the process according to the invention without any effect whatever upon their catalytic activity.

The arrangement reaction employing the catalyst according to the invention can be carried out at 200 to 400° C., and preferably at 270 to 360° C., either at normal pressure or at reduced pressure, in the presence of steam and optionallqy in the presenuce of a carrier gas.

Oximes of cyclic ketones containing from 5 to 12 carbon atoms in the ring lend themselves particularly well to rearrangement, for example cyclopentanone oxime, cyclohexanone oxime, cycloheptanone oxime, cyclooctanone oxime, cyclododecanone oxime and methyl cyclohexanone oxime.

To prepare the catalyst, boric acid and the supporting material, for example titanium dioxide, calcium phosphate or carbon black, are thoroughlhy mixed and made into a paste with an aqueous solution of the nitrogen-containing compound, for example urea or ammonia. The mass thus formed is dried, heated at 250 to 900° C. and then size-reduced. It is also possible to bring the catalyst material into a predetermined form before heat treatment, for example by pelletising or by extrusion.

The following examples are to further illustrate the invention without limiting it.

Examples 1 to 10

The following Table shows Examples comparing the abrasion resistance of different boric acid-containing catalysts with and without additions of $NH_4OH$, urea, guanidine carbonate and thiourea. The second column of the Table shows the starting mixture of boric acid and supporting material, and the third column shows the type and quantity of additive promoting solidification of the catalyst. To prepare the catalysts, boric acid and supporting material were mixed in a kneader, after which the additive (e.g. urea) was introduced in the form of an aqueous solution and a paste prepared. This paste was dried at 120° C. and then heat-treated for 3 hours at 700 to 800° C. (Examples 1 and 2) and for 3 hours at 580° C. (Examples 3 to 10).

The catalyst composition thus obtained was ground and those grains from 0.1 to 0.5 mm. in diameter were separated. To determine abrasion, catalyst samples each of 50 g. were kept for 200 hours in a state of turbulent fluidisation over a frit in a glass tube 5 cm. wide. The catalyst samples were then graded through a 0.1 mm. wide mesh screen to separate the fine component formed as a result of friction and the residue was weighed. The difference between the weight of the residue and the initial weight is a measure of the abrasion and is expressed in percent (cf. Table, column 4). In other words, in all the comparison tests the additives bring about a considerable reduction in abrasion.

In order to demonstrate the catalytic activity of the catalyst according to the invention, a rearrangement reaction involving cyclohexanone oxime was carried out with 10 g. of the catalyst of Example 10.

For this purpose, 14.5 g. per hour of cyclohexanone oxime, containing 4% by weight of water, and 60 litres per hour of nitrogen were passed over the catalyst sample at a temperature of from 330 to 350° C. The reaction product collected over a period of 6 hours contained 98% of caprolactam and 2% of secondary products.

TABLE

| Ex. | Catalyst mixture | Additives | Abrasion in percent by weight |
|---|---|---|---|
| 1 | 300 g. $Ca_3(PO_4)_2$ plus 300 g. $H_3BO_3$ | | 15.2 |
| 2 | 230 g. $Ca_3(PO_4)_2$ plus 230 g. $H_3BO_3$ | 50 g. urea | 5.4 |
| 3 | 600 g. $TiO_2$ (anatase) plus 150 g. $H_3BO_3$ | | 8.2 |
| 4 | do | 50 g. urea | 2.4 |
| 5 | 160 g. carbon black plus 240 g. $H_3BO_3$ | | 2.4 |
| 6 | do | 30 g. urea | 1.8 |
| 7 | do | 220 g. 12% by weight $NH_3$ solution | 1.0 |
| 8 | 180 g. carbon black plus 220 g. $H_3BO_3$ | | 10.0 |
| 9 | do | 50 g. guanidine carbonate | 2.0 |
| 10 | do | 50 g. thiourea | 1.6 |

What is claimed is:

1. Abrasion-resistant catalysts containing boric acid and boron nitride suitable for the preparation of lactams by the rearrangement of cyclic ketoximes containing 5 to 12 carbon atoms in the ring in the gaseous phase at a temperature of 200° C. to 400° C., obtained by heating at a temperature of 250° to 900° C., (A) a mixture of boric acid and a supporting material in a weight ratio of boric acid: supporting material of 1:4 to 3:2; and (B) 1–30% by weight based on (A) of a nitrogen-containing compound which forms boron nitride with boric acid or boron trioxide, selected from the group consisting of $NH_4OH$, $(NH_4)_2CO_3$, $NH_4Cl$, urea, guanidine and thiourea.

2. The catalyst of Claim 1 in which said nitrogen-containing compound (B) is employed in an amount of 1–10% of (A).

3. The catalyst of Claim 1 in which said nitrogen-containing compound (B) is $NH_4OH$.

4. The catalyst of Claim 1 in which said nitrogen-containing compound is urea.

5. The abrasion-resistant catalyst of Claim 1 having greater abrasion resistance than the non-nitrided mixture of (A) of boric acid and supporting material.

6. The abrasion resistant catalysts of Claim 1 in which the heating of (A) and (B) is conducted for a period of time sufficient to effect nitriding.

References Cited

UNITED STATES PATENTS

| 3,241,919 | 3/1966 | O'Connor | 252—432 UX |
| 3,574,193 | 4/1971 | Immel et al. | 252—432 |
| 3,630,889 | 12/1971 | Arey et al. | 252—432 X |

FOREIGN PATENTS

| 874,165 | 8/1961 | Great Britain | 23—204 |
| 874,166 | 8/1961 | Great Britain | 23—204 |

PATRICK P. GARVIN, Primary Examiner

U.S. Cl. X.R.

260—239.3 A